United States Patent [19]

Solomon

[11] Patent Number: 5,168,273

[45] Date of Patent: Dec. 1, 1992

[54] SEQUENTIAL ANALOG/DIGITAL DATA MULTIPLEXING SYSTEM AND METHOD

[75] Inventor: Elias E. Solomon, Duxbury, Mass.

[73] Assignee: Potter Electric Signal Company, St. Louis, Mo.

[21] Appl. No.: 664,206

[22] Filed: Mar. 14, 1991

[51] Int. Cl.$^5$ .............................................. G08B 26/00
[52] U.S. Cl. ........................ 340/870.05; 340/825.54; 340/825.08; 340/505
[58] Field of Search ............ 340/825.07, 825.08, 340/825.21, 870.05, 870.09, 870.11, 870.13, 825.02, 825.37, 825.54, 505, 518, 825.05; 370/95.2, 85.8

[56] References Cited

U.S. PATENT DOCUMENTS

| | | | |
|---|---|---|---|
| 4,603,318 | 7/1986 | Philp | 340/505 |
| 4,612,534 | 9/1986 | Buehler | 340/505 |
| 4,727,359 | 2/1988 | Yuchi | 340/825.08 |
| 4,742,335 | 5/1988 | Vogt | 340/825.08 |
| 5,045,851 | 9/1991 | Davis, III | 340/870.13 |

Primary Examiner—Donald J. Yusko
Assistant Examiner—Michael Krakovsky
Attorney, Agent, or Firm—Wolf, Greenfield & Sacks

[57] ABSTRACT

An analog and digital data-gathering system where the data gathering remote device or sequencer units are serially connected such that initially only the device closest to a control unit is powered and other data-gathering devices in the system are sequentially switched into circuit as each such remote device or sequencer unit responds to polling signals from the control unit. The system initially measures the signal from the wiring to a remote device or sequencer unit without the device being activated in order to determine the noise level present in the circuit wiring. The corresponding remote device is then activated by being interrogated or polled after that noise level has been determined.

17 Claims, 4 Drawing Sheets

SEQUENTIAL ANALOG/DIGITAL DATA MULTIPLEXING SYSTEM AND METHOD

FIELD OF THE INVENTION

The present invention relates to apparatus and method for electrical communications, and more particularly to electrical communication apparatus and method having indication or alarm such as location or value indication for an interrogation response, and to condition responsive indicating systems and methods.

BACKGROUND OF THE INVENTION

Previous methods for transmitting multiplexed analog signals from remote locations involved using an analog to-digital converter at each such remote location, and transmitting data in digital form. A digital to analog converter is needed at the data gathering control, or receiving location, for the transmitted signals. In addition, each such remote location had to have means of being addressed, and of sending -to the data gathering control- the address of its location. The accuracy of the data for such prior art systems is based on the accuracy and resolution of the analog-to-digital converter, noise, the integrity of the transmitting medium, and the accuracy and resolution of the digital-to analog converter at the data gathering control. The speed of gathering data for systems based on digital transmission is dependent on the length of the code used for the address/response (together with any bits or codes used for checking) and the sampling rate.

There are many methods for multiplexing data. These usually involve the use of modems distributed along a loop. These modems have unique addresses and are polled either sequentially or randomly. Connecting circuits sequentially is not new. For example, in telephone systems, the path from one loop to another is sequentially made via selectors. The following prior art apparatus and method, for sequentially obtaining digital information from sensors connected to remote sequencer units, is described for purposes of comparison with the present invention, which is described later.

Reference is now made to prior art FIG. 1, which shows a prior art arrangement of sequencer units 11-1, 11-2, . . . , 11-N, . . . , 11-Z. The reference characters utilized herein for sequencer units 11 and switches 15 are not intended to indicate any particular number of sequencer units or switches being used in a particular system. Each sequencer unit 11 includes a sensor 13 and a series switch 15. The dashed line in each sequencer unit 11 of FIG. 1 indicates that the series switch 15 associated with a particular sequencer unit 11 is operated by that sequencer unit to make connection to the next downstream sequencer unit. The sequencer units 11 are distributed about a volume of space, and the sensors 13 thereof monitor a certain quality of that volume, such as whether that quality exceeds a preset threshold. For example, such sequencer units 11 can be utilized to monitor whether there is a fire within the interior of a building. Sequencer units 11-1 through 11-Z are distributed along a loop of two or more wires or electrical lines 17 and 19. One end of lines 17, 19 is connected to control 21 monitoring sequencer units 11. The other end of lines 17 and 19 is connected to end of line device 23. End of line device 23 is connected across lines 17 and 19 to provide a termination, permitting continuity of current flow along the lines.

Initially, only sequencer unit 11 1 closest to control 21 is electrically connected to the control, because series switches 15 are then open. The other downstream sequencer units 11 2, etc. have one or both of lines 17 and 19 electrically open between them by action of switches 15. Periodically, control 21 will interrogate or poll each sequencer unit 11 to determine its status, confirm proper operation, learn whether a monitored condition has exceeded a preset threshold, or for any other appropriate reason. Such interrogation can be referred to as polling or as a polling sequence. One example of signals generated by the system of FIG. 1 during such a polling sequence is illustrated in FIG. 2. To initialize each polling sequence for sequencer units 11, a relatively high voltage (for example, 24 volts) is transmitted by control 21 for a relatively long duration (for example, 1 second) on the loop formed by lines 17 and 19 and end of line device 23. This transmission is identified in prior art FIG. 2 as initializing pulse IP. This sustained high voltage causes all the sequencer units 11 to interconnect by causing their associated switches 15 to close. This is a ripple effect for as the first sequencer unit 1-1 closes its switch 15-1, that sequencer unit impresses the high voltage of pulse IP onto the second sequencer unit 11-2 and causes it to close its associated switch 15-2, and so on. After sufficient time (for example, the one second duration described above) has elapsed to allow for this sequence to have propagated to the last sequencer unit 11-Z, so that its switch 15-Z has closed, this applied voltage is then reduced to a lower value also known as a working voltage (for example, 18 volts). This reduction in voltage causes all of the series switches 15 to open, so that only the first sequencer unit 11-1 is now connected to control 21, and the remaining sequencer units are reset and so disconnected from the loop. Control 21 then sends out a high voltage poll advance pulse or polling pulse Pl consisting of a high voltage for a short period, such as 24 volts for two milliseconds. Removal of polling pulse P1 causes sequencer unit 11-1 to transmit a response pulse R1.

In FIG. 2, the initializing pulse is identified as IP, the successive polling pulses for each sequencer unit 11-1, . . . , 11-Z are respectively identified as P1, . . . , PZ, and the response pulses for each such sequencer unit are respectively identified as R1, . . . , RZ. Each polling pulse P is identical, and can for example have an amplitude of 24 volts and a duration of 2 milliseconds. However, the response pulses R vary in width depending on the condition of the corresponding sequencer unit 11. The first polling pulse P1 causes the first sequencer unit 11-1 to be initialized, that is to have its switch 15-1 closed. At the end of the first polling pulse P1, control 21 waits for the sequencer unit 11-1 polled to transmit a return pulse R1. The response pulses R vary in width or duration depending on the condition of the corresponding sequencer unit. The duration of this return pulse R1 is interpreted as a normal, below normal or above normal condition at the control 21. As shown in FIG. 2, a duration of T1 indicates a normal condition, a shorter duration of T2 indicates a below normal condition, and a longer duration of T3 indicates an above normal condition. For example, a two millisecond return pulse could be interpreted as a "trouble" condition or a defective sequencer unit 11, and a five millisecond pulse could be interpreted as indicating normal condition for that unit. Also, a ten millisecond pulse could be indicative of external trouble being sensed by the sensor 13 of that sequencer unit 11 such that control 21 should generate an alarm in response thereto. Control 21 includes a counter (not shown) for keeping track of the pulse number for the polling pulse P sent, so that any abnormality is associated with the particular sequencer unit 11 being polled by that pulse. The address or number of each sequencer unit 11 is associated with its position in the loop. Thus, if the first polling pulse P1 is sent out, and the response from the first sequencer unit 11-1 is a normal duration T1 of the response pulse R1, then control 21 tags or identifies sequencer unit 11-1 in the control's memory as being of normal condition.

At the end of the first polling pulse P1, first sequencer unit 11-1 closes its switch 15-1 to connect the first sequencer unit 11-1 to the second sequencer unit 11-2. The second sequencer unit 11 2 is thereby electrically connected to the loop, so that the working voltage, and a subsequent polling pulse P2, from control 21 would be impressed on sequencer unit 11-2. The next high voltage poll pulse P2 causes the second sequencer unit 11-2 to be initialized. When poll pulse P2 is removed, it causes sequencer unit 11 2 to transmit a response pulse R2, shown in FIG. 2 as being, for example, two milliseconds (duration T2). Because the duration of return pulse R2 is below normal, control 21 tags the second sequencer unit 11-2 as abnormal. The end of polling pulse P2 causes switch 15-2 connecting the second sequencer unit 11-2 to the third sequencer unit 11-3 (not illustrated) to be closed, so that the third sequencer unit 11-3 is now connected to the loop and has the working voltage applied to it. This sequence of generation of polling pulse, generation of response pulse and closing of a switch 15 continues until all the sequencer units 11 have been polled by control 21. At the end of a pre-programmed number of polling pulses, ordinarily determined from the number of sequencer units, the sequence is reset by control 21. Control 21 then causes the loop to be reset by again sending initializing pulse IP, which reduces the voltage to the loop to open all switches 15. After resetting, the polling sequence is started again.

Although such devices have served the purpose, they have not proven entirely satisfactory under all conditions of service for the following reasons. Sequencer units cannot be polled randomly with the system of FIGS. 1 and 2. Also, the system depends on the duration of the return pulse to determine the condition of the sequencer unit. Because of the digital nature of the return pulse, the inherent capacitance of the loop wiring 17 and 19 will modify the wave shape of the return pulse, which can cause incorrect interpretation of the response signal by control 21 unless fairly wide pulse widths are used. Utilization of fairly wide pulse widths can introduce additional delay into the system and increase the time necessary to poll all sequencer units 11 in a particular loop. If there are many such units in the loop, a low-numbered sequencer unit such as 11-1 or 11-2 can detect that the threshold being monitored has been exceeded, which could indicate a hazardous condition that would not be communicated to control 21 until all other sequencer units in the loop have been polled. Since the polling pulses and response pulses are digital, a transient can cause either a false poll or a distortion or erroneous reading of a polling pulse or a response pulse. A very limited number of pulse widths can be transmitted, even if control 21 has very high resolution. As a result, very little information can be transmitted in the response pulses from the sequencer units 11. To obtain more information, a very wide range of return pulse widths would have to be accommodated by control 21, resulting in a very slow system with substantial delays between most pulses.

Furthermore, the sequential nature of the loop of FIG. 1 makes it complicated and difficult to branch from, or to add a branch to, the main loop and still keep the sequencer units 11 in sequence at control 21. Also, random polling of the sequencer units is not possible with the system of FIG. 1. Besides, it is not possible to stop the polling at any one sequencer unit, to obtain the status or level of the signal present at the sequencer unit or to obtain more information from a particular sequencer unit. The system of FIG. 1 is digital; analog data signals cannot be transmitted via such a system.

SUMMARY OF THE INVENTION

Accordingly, it is the general purpose of the present invention to provide apparatus and method for sequentially retrieving and multiplexing analog or digital data.

Other objects of the present invention are to provide apparatus and method for sequential multiplexing of analog and/or digital data which apparatus and method are inexpensive and simple, which do not require shielded wires, which can compensate for any unwanted signals generated in the transmitting medium, and which can be built using inexpensive standard discrete and integrated circuits, gates, etc.

Briefly, these and other objects of the present invention are accomplished by an analog and digital data-gathering system. In this system, data gathering devices, or sequencer units, are serially connected such that initially only the device closest to a controller is powered, and other devices in the circuit are sequentially switched into the circuit as each data gathering device responds to polling signals from the controller. The data gathering devices can be disposed remotely from the controller. This system initially measures the signal from the wiring to the data gathering device without the device being activated, in order to determine the noise level present in the circuit wiring. The system is interrogated or polled by the controller after first determining the noise level. Each data gathering device is activated only during the presence of a polling signal. Each data gathering device generates a current dependent on the voltage present at one of its inputs, such current being independent of the voltage across the data gathering device. That current is terminated when the polling signal is removed, and will not be generated again if any subsequent polling signal is applied to that data gathering device unless preceded by a reset signal. Each such data gathering device includes a switch that is turned on at the end of the corresponding polling signal to complete the electrical path to the next-connected data gathering device. The controller initially measure the noise level of the wiring connecting it to data gathering devices, and then sequentially turns on each such data gathering device for a programmed period of time to determine the analog or digital level of the signal at the data gathering device. The controller computes the corrected value of the signal at the data gathering device by subtracting the signal noise level from th signal level obtained while the data gathering device is being polled. The controller initially stores, as the noise level, any signal obtained from the circuit wiring or from the data gathering device. The controller then removes the signal from the input to the storage means before reading the level of the stored signal. The controller then removes the stored signal after reading the level of the stored signal, and subsequently restores the stored signal to the input of its storage means. The controller converts the current generated by the noise present on the interconnecting wires, or from data gathering devices, to an analog voltage. The controller has an analog to digital converter which converts that analog voltage to a digital output suitable for processing by a microprocessor or similar device. The controller has a counter or similar device for keeping count of the polling pulses, and is therefore capable of identifying the data gathering device being polled.

The controller polls a selected data gathering device by sending a signal to provide an input to an AND gate in that device in order to operate that device. The controller logs or store the signal levels obtained from each data gathering device.

The controller can provide a display and an output when the signal level from one or more data gathering devices reaches or exceeds a first preset threshold, or when that occurs for a preset number of polling cycles. That output could be an alarm. The controller furthermore can provide a display and an output when the signal level from one or more data gathering devices falls below a second preset threshold. In addition, means is provided for continuously measuring and compensating for any unwanted signals generated in the wiring interconnecting the data gathering devices.

The controller can display the number of the data gathering device being polled by virtue of that data gathering device's position in the polling sequence. The controller can display the noise level present on the wiring leading to the data gathering device, prior to that data gathering device being polled. The controller can thereafter display the analog or digital signal generated by the data gathering device then being polled by the controller. The controller can continuously read a selected data gathering device and display the analog signal level from that device.

The speed for a system which depends on measuring an analog current is dependent on the sampling rate and can be very fast and independent of the analog level. Because the data gathering devices generate current, their output is less susceptible to electrical interference and transients, as it would take a high level of induction to generate troublesome signal levels. The effect of such induced signals can be minimized by using standard twisted wires.

Other objects, advantages and novel features of the invention will become apparent from the following detailed description of the invention when considered in conjunction with the accompanying drawings.

DESCRIPTION OF THE PREFERRED EMBODIMENT

Figure 1:
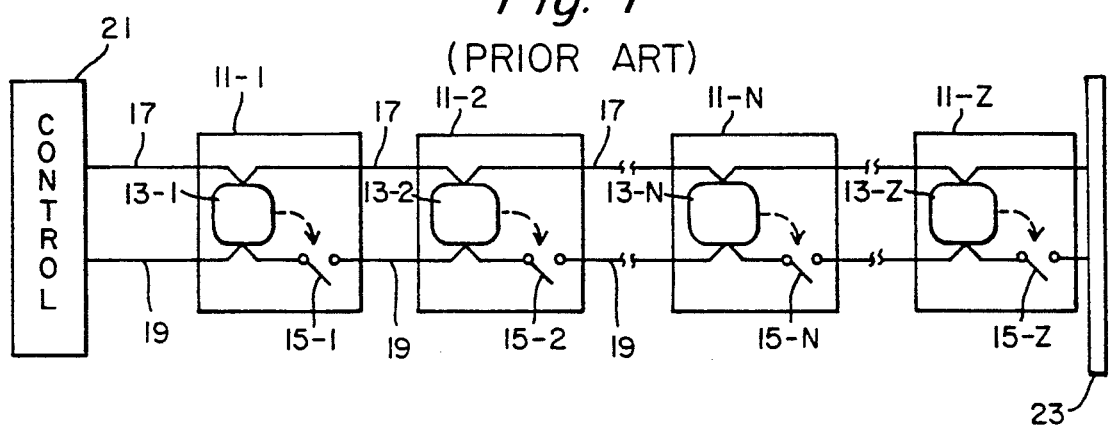
FIG. 1 is a diagrammatic representation of a prior art sequential digital multiplexing system.
Figure 2:
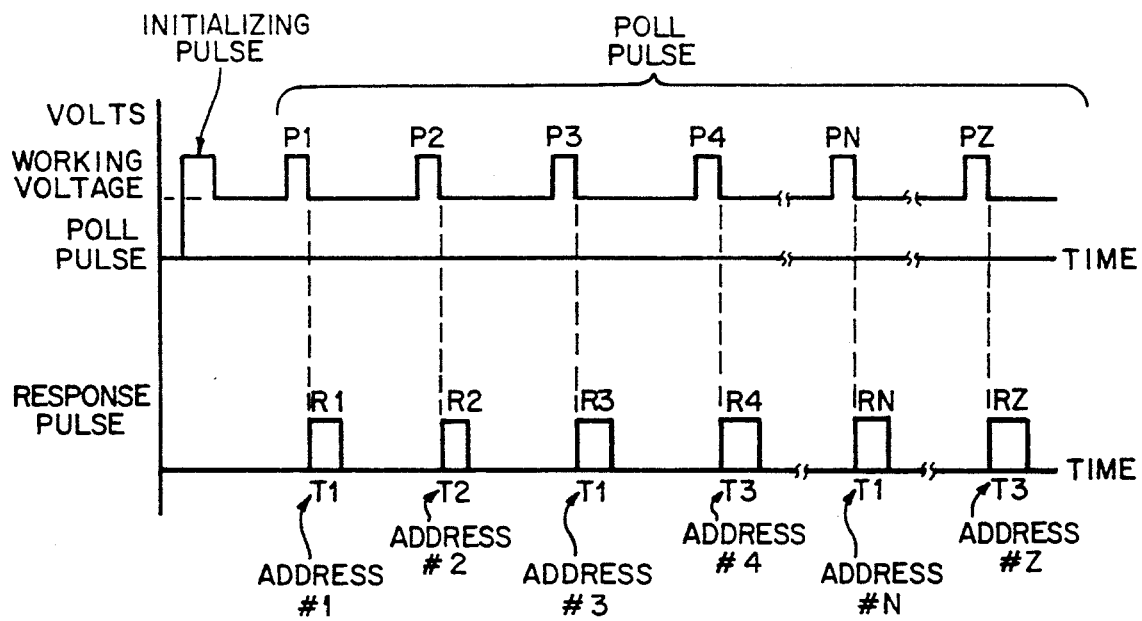
FIG. 2 illustrates signals internally generated by the apparatus of FIG. 1.
Figure 3:
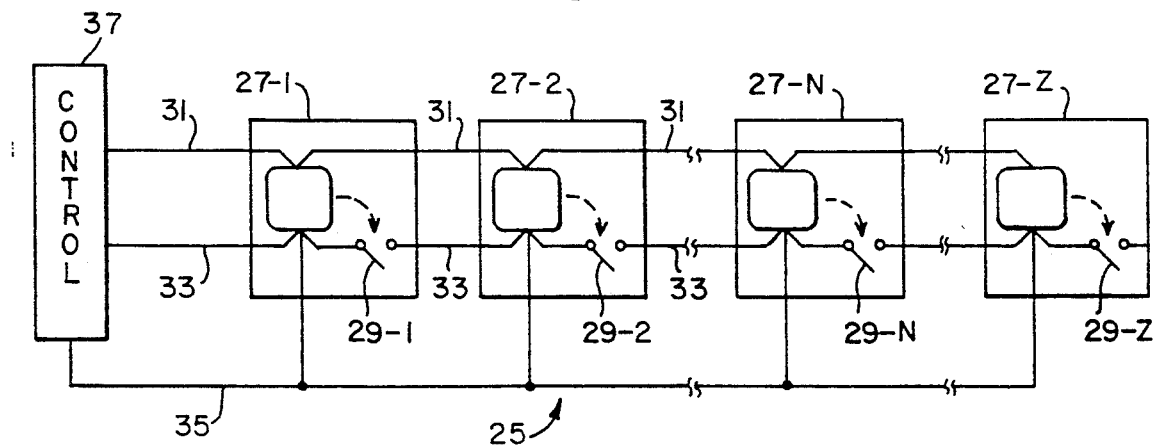
FIG. 3 is a diagrammatic representation of a sequential multiplexing system according to the present invention.
Figure 7:
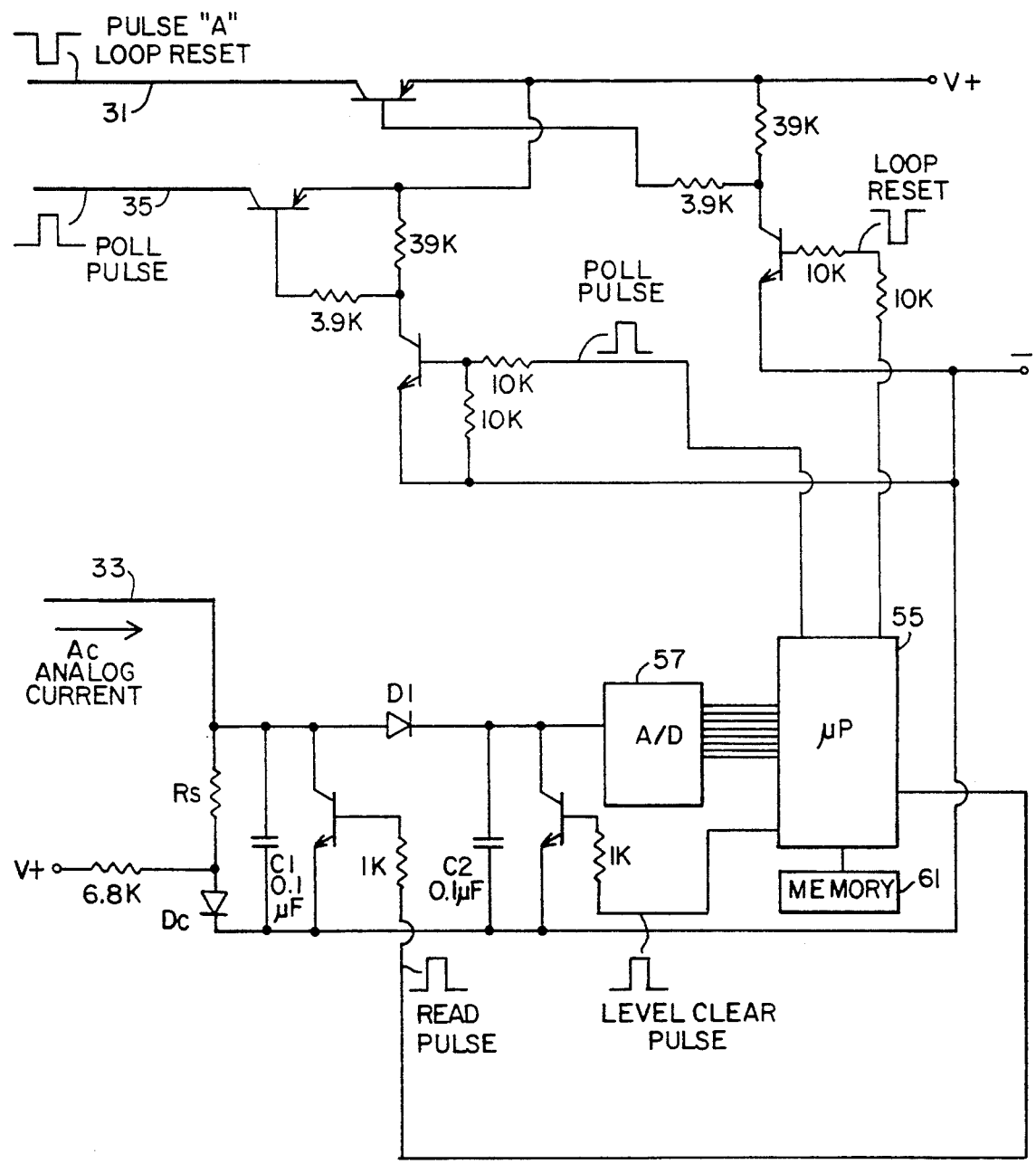
FIG. 7 is a diagrammatic representation of a controller that can be utilized in the apparatus of FIG. 3 according to the present invention.

Referring now to the drawings, wherein like reference characters designate like or corresponding parts throughout the several views, there is shown in FIG. 3 a sequential multiplexing system 25 for sequential multiplexing of analog or digital data. System 25 includes a plurality of sequencer units or transponders 27-1, 27-2, . . . , 27-N, . . . 27-Z. Each sequencer unit 27 includes a correspondingly numbered switch 29-1, 29-2, . . . , 29-N, . . . 29-Z. The reference characters utilized herein for sequencer units 27 and switches 29 are not intended to indicate any particular number of sequencer units or switches being used in a particular version of system 25. Sequencer units 27 are distributed about a volume of space, and each include a sensor monitoring a certain quality of that volume, such as whether that quality exceeds a preset threshold. For example, such sequencer units 27 can be utilized to monitor whether there is a fire within the interior of a building. Sequencer units 27-1 through 27-Z are distributed along a loop of three wires or electrical lines 31, 33 and 35. One end of lines 31, 33 and 35 is connected to control 37 monitoring sequencer units 27. FIG. 7 is a partially schematic diagrammatic representation of control 37.

Figure 4:
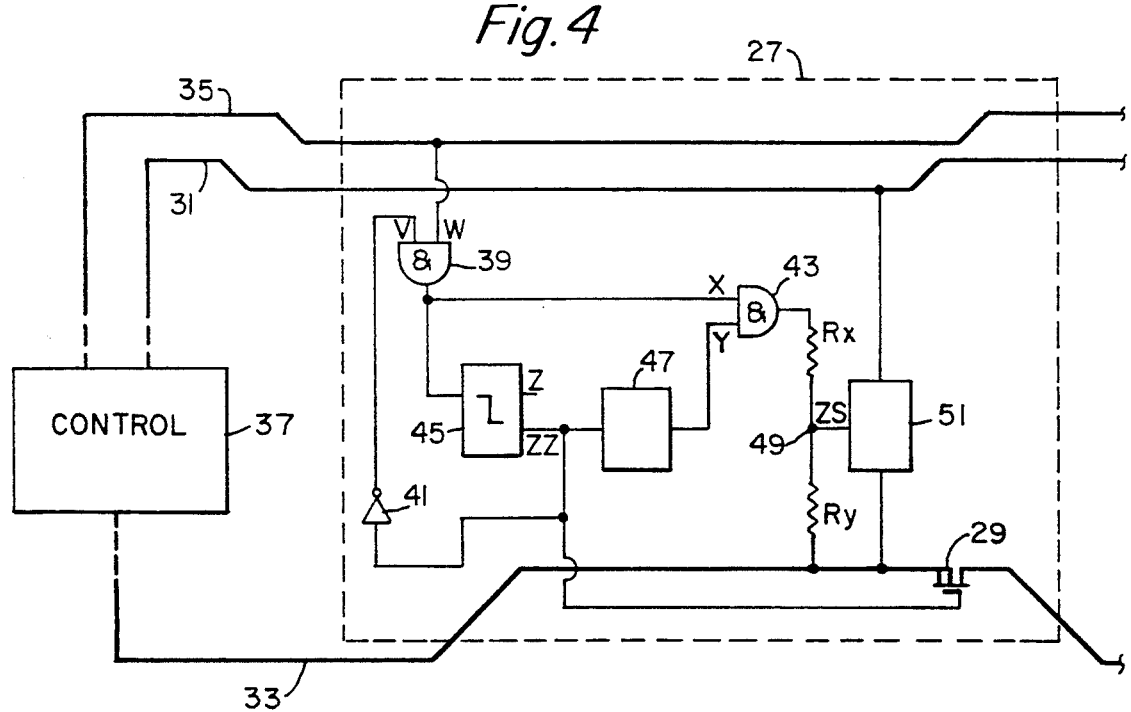
FIG. 4 is a diagrammatic representation of one embodiment of a sequencer unit that can be included in the apparatus of FIG. 3 according to the present invention.

One embodiment of sequencer unit 27 is illustrated in FIG. 4. Line 35 provides input W to AND gate 39. Line 33, via inverter 41, provides the other input V to AND gate 39. The output of AND gate 39 is provided as input X to AND gate 43. The output of AND gate 39 is also provided as the toggling or trigger input to latch 45. Latch 45 is a negative transition triggered latch. Latch 45 changes state when it receives at its input a trailing edge, or negative transition. This change of state is reflected at its two outputs Z and ZZ. Output ZZ can, for example, be the not Q latch output. Output ZZ of latch 45 is provided as an input to switch 29. Switch 29 can, for example, be a VMOS, MOSFET or other switching device. Output ZZ of latch 45 is also provided as an input to inverting latch 47. The drain and source terminals of switch 29 are connected across line 33. Latch 47 retains, and produces as its output, the inverse of the signal on output ZZ of latch 45. Latch 47 thereby provides the other input Y to AND gate 43. Connected between the output of AND gate 43, and line 33 before switch 29, is a sensor in the form of a voltage divider 49 whose divided output is provided as an input to voltage to current converter 51. Converter 51 is also connected between line 31 and (before switch 29) line 33.

Figure 6:
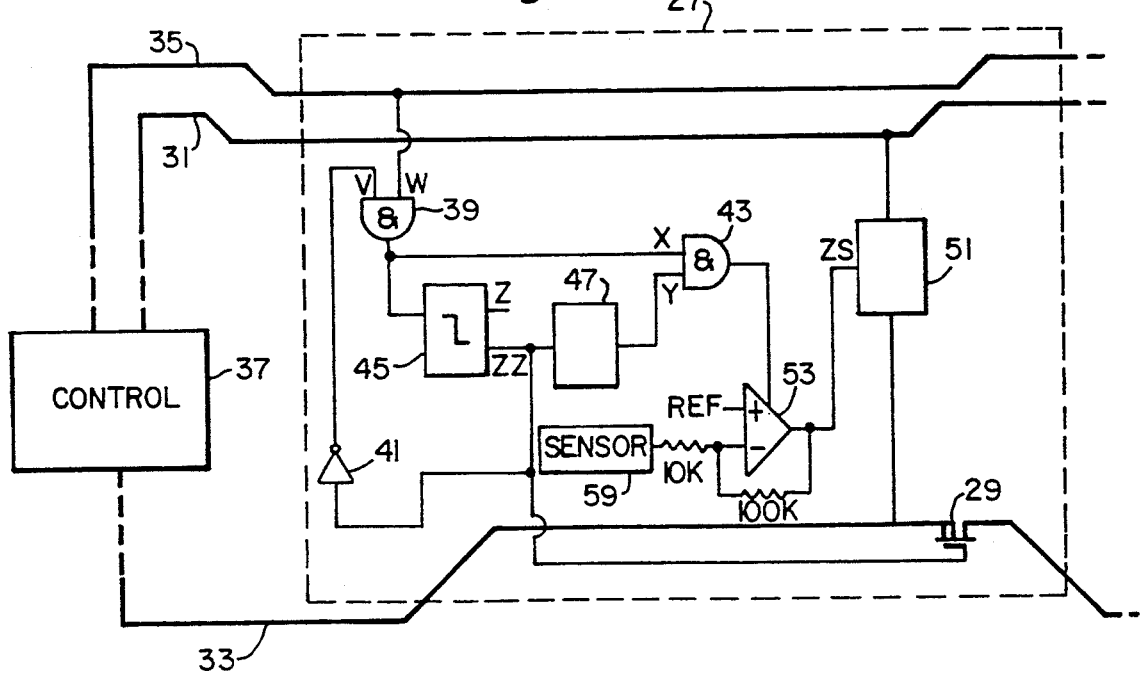
FIG. 6 is a diagrammatic representation of an alternative embodiment of a sequencer unit that can be utilized in the apparatus of FIG. 3 according to the present invention.

Alternatively, as shown in FIG. 6, sequencer unit 27 can include, in lieu of voltage divider 49, an operational amplifier 53 whose output is provided as the corresponding input to voltage to current converter 51.

As used herein, the term "sequencer unit" refers to a component or device connected to a loop and capable of generating a current whose value is dependent on an input voltage. The sequencer unit only responds once during a polling cycle. After responding to a poll pulse, the sequencer unit completes a path to the next sequencer unit in the loop. As used herein, the term loop refers to the electrical wiring to the sequencer units. Several sequencer units may be connected to a loop.

Operation of the system of FIGS. 3 and 4 is as follows. At power up and in the normal state of sequencer unit 27, the levels on lines 33 and 35, controlled by control 37, are normally low. Accordingly, input W to AND gate 39 is low, while input V provided by inverter 41 is normally high. Thus, the output of AND gate 39 is normally low. Latch 45 is a two state device which changes state only when there is a negative going transition (not a steady state) at the input. For example, latch 45 can be one of the four latches of the National Semiconductor CD4042BM/CD4042BC Quad Clocked D Latch. As shown in FIG. 7, control 37 includes a microprocessor or other computer 55. When power is first applied to system 25, microprocessor 55 transmits Loop (or System) Reset pulse A on line 31 for a short period of time in order to reset all sequencer units 27 in system 25. This Loop Reset pulse is shown as pulse A in FIG. 5. This Loop Reset pulse is a pulse lasting for a programmed period of time (controlled by microprocessor 55) that is produced on initially powering up system 25. Loop Reset pulse A removes power from the loop 31, 33 and 35 wiring sequencer units 27 together. This results in all sequencer units 27 being forced into an OFF state.

Figure 5:
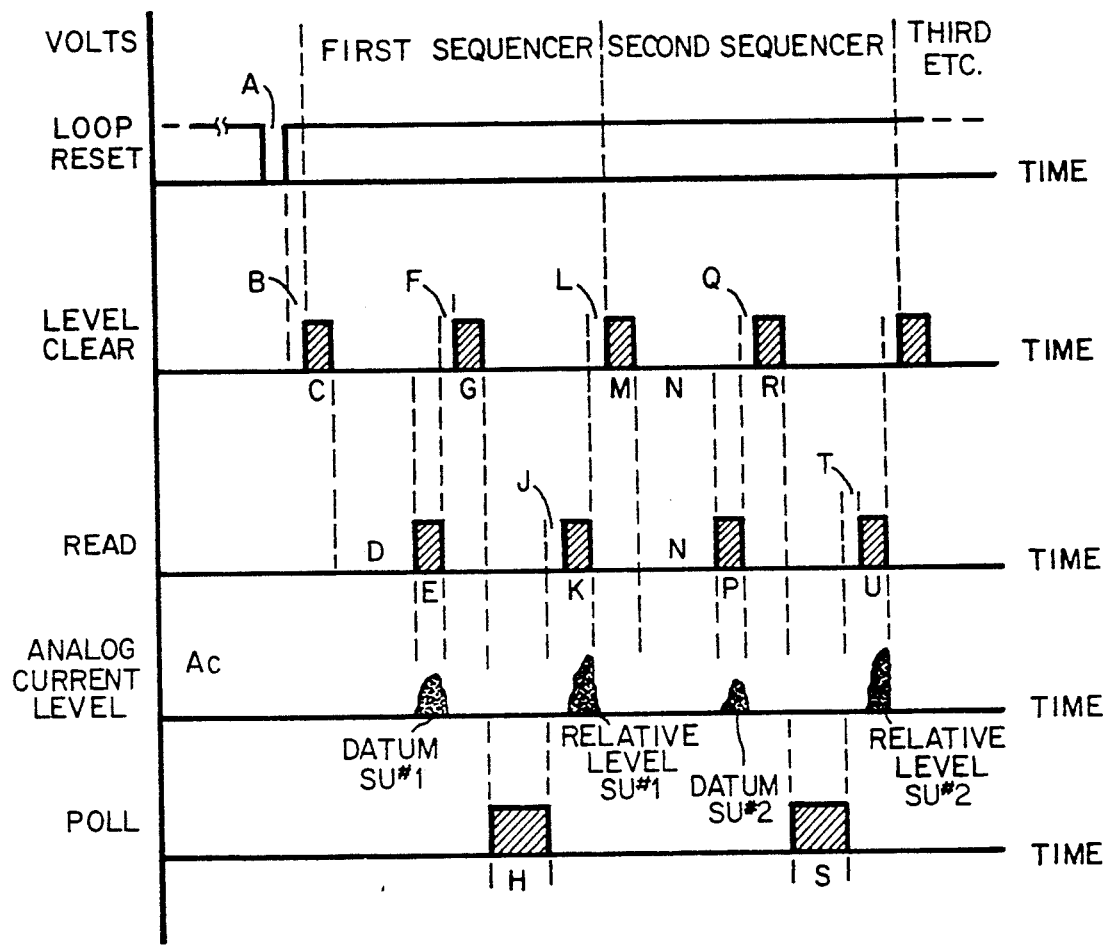
FIG. 5 illustrates signals internally generated and utilized by the apparatus of FIG. 3.

As shown in FIG. 5, immediately following Loop Reset pulse A is a wait period B. This wait period allows system 25 to settle. At the end of wait period B, a Level Clear pulse (shown as pulse C in FIG. 5) is applied by microprocessor 55 to storage capacitor C2 of FIG. 7. A Level Clear pulse is a pulse from microprocessor 55 lasting for a pre-programmed period of time. The Level Clear pulse is used to discharge the storage capacitor C2 holding the analog voltage $A_c$ acquired either for the datum or the relative sequencer level readings, both described below. The Level Clear pulse is also produced at the end of the polling cycle. For the latter situation, the Level Clear pulse removes power for a short period of time in order to reset the sequencer units 27. However, for the present situation, the initial Level Clear pulse C discharges any residual voltage across capacitor C2 while that pulse lasts. At the end of initial Level Clear pulse C, there is a wait period D. Capacitors C1 and C2 are charged during this wait period D by the analog current $A_c$ flowing through the loop 31, 33 and 35. The level of the analog current $A_c$ during wait period D is dependent on the stray current generated in the wiring connected to the first sequencer unit 27-1. The other sequencer units 27-2, ..., 27-N, ... 27-Z are not connected to control 37, since switch 29-1 of the first sequencer 27-1 is open due to loop reset pulse A. The analog current level $A_c$ on line 33, and the value of resistor $R_s$ of FIG. 7, determine the voltage to which capacitors C1 and C2 charge. During wait period D, the analog current level on line 33 is in effect the leakage current or noise picked up by the wiring 31, 33 and 35. At the end of wait period D, microprocessor 55 of control 37 transmits a Read pulse E which shortcircuits capacitor C1. The Read pulse is a pulse, lasting for a pre programmed period of time, which reads the digital level from the analog to-digital converter 57 of control 37, while simultaneously shortcircuiting the input across the sense resistor $R_s$. During pulse E, simultaneously microprocessor 55 reads the output of capacitor C2 via analog to digital converter 57. The reason for the shortcircuit of capacitor C1 is to disconnect or shunt any transients from the input to the analog-to digital converter 57 during the Read pulse. Alternatively, a gate or switch could be substituted for diode D1, and microprocessor 55 would then open that gate or switch during each Read pulse. However, utilization of diode D1 is preferred because any solid state switch or gate inserted in lieu thereof would have an impedance, and so could modify the charge time and therefore the voltage level of capacitor C2. Microprocessor 55 now stores the datum or noise level from the wiring 31, 33 and 35 leading to first sequencer unit 27-1. As used herein, the term datum refers to a voltage reading taken across sensor resistor $R_s$ prior to a sequencer 27 being polled by control 37. This datum voltage is generated by noise-induced or extraneous current in the loop wiring 31, 33 and 35. At the end of Read pulse E, there is a short wait period F. Wait period F allows system 25 to settle.

At the end of wait period F, a Level Clear (defined above) pulse G is applied. Level Clear pulse G results in shortcircuiting and thus discharge of storage capacitors C1 and C2. Level Clear pulse G thereby discharges any residual voltage across capacitors C1 and C2, and thereby prepares capacitor C1 and C2 for charging from the current generated by first sequencer unit 27-1.

At the end of Level Clear pulse G, a Poll pulse H is generated by microprocessor 55 and is transmitted by control 21 on polling line 35. As used herein, a Poll pulse is a pulse lasting for a pre-programmed period of time and occurring periodically. The Poll pulse is used to activate each sequencer unit 27-1, 27-2, ..., 27-N, ..., 27-Z in turn. During the Poll pulse, the sequencer unit 27 being polled transmits an analog current which develops a voltage across sensor resistor $R_s$. The Poll Cycle is a sequence of a pre-programmed number of Poll pulses at the end of which a Loop Reset pulse is transmitted on line 31 before the next polling cycle starts. Poll pulse H switches first sequencer 27-1 into the loop formed by lines 31, 33 and 35 with control 37. When a Poll pulse is applied via line 35 to a sequencer unit 27, input W of AND gate 39 goes high. Since the other input V to AND gate 39 is already high, the output of that gate now goes high. Since the output of AND gate 39 is now high, input X of AND gate 43 also goes high. Since no trailing edge has yet appeared at the output of AND gate 39, latch 45 does not now change state. Since the input to latch 47 is accordingly low, input Y of AND gate 43 is high. The output of AND gate 43 thereby goes high and provides a positive voltage level to voltage divider 49 for input to voltage-to-current converter 51. The current generated by converter 51 is proportional to the voltage at its input ZS. Since the voltage produced by AND gate 43 will only have two levels, the value of resistor $R_y$ determines the current generated by converter 51. The current produced by converter 51 is independent of the voltage placed across the converter between lines 31 and 33. Accordingly, if resistance $R_y$ represents the effective resistance of a sensor connected between point ZS and line 33 before switch 29, which resistance varies with the value sensed by that sensor, then the current produced by converter 51 will be indicative of the value of the quality or variable being monitored by sequencer unit 27, but only when the output of AND gate 43 is high. Thus, by varying the resistance of $R_y$, the current generated by converter 51 is altered. Sensor $R_y$ could be an NTC or a PTC resistor or thermistor. The resistance of such devices varies with temperature, thereby varying the input voltage to convertor 51. This in turn changes the current through convertor 51. Alternatively, sensor $R_y$ could be a photocell. Alternatively, any type of sensor which produces a voltage change at the input of convertor 51 may be used. For example, there are commercially available flow, liquid level, humidity, etc. sensors available which provide a change in voltage for a change in the monitored condition.

Alternatively, the current generated by converter 51 can be determined by the sequencer unit of FIG. 6. In FIG. 6, when AND gate 43 is switched on a described in the preceding paragraph, it powers an operational amplifier 53. Operational amplifier 53 can for example be a CAE 3240 amplifier. The voltage output of operational amplifier 53 is dependent on the signal level at its input, which is provided by sensor 59. As with sensor $R_y$ of FIG. 4, sensor 59 could be an NTC or PTC resistor or thermistor, photocell, or a commercial sensor, connected across a voltage source. The voltage at the input to amplifier 53 would be thereby changed, which in turn would cause the amplifier 53 output voltage to change. This amplifier 53 output voltage change would cause a change in current in convertor 51. The output of operational amplifier 53 is applied to input ZS of converter 51, which in response generates an analog current level dependent on the signal at its input ZS. The reference voltage REF applied at the other input of amplifier 53 can, for example, be ground. Preferably, reference voltage REF is selected based on the voltage on lines 31, 33 and 35, and could be up to 30 volts. If the output signal of AND gate 43 is not high, then amplifier 53 is not powered, and the amplifier then produces a null output signal. Appropriate scaling of the output of amplifier 53 can be accomplished by appropriate selection of its input and shunt resistors, shown in FIG. 6. However, the values shown in FIG. 6 for those resistors (for gain $A_v=10$) are only illustrative; other values can be used for other desired gains. In FIG. 4, scaling of the voltage signal applied to input ZS of converter 51 can be accomplished by appropriate selection of resistor $R_x$ relative to the normal value of resistance $R_y$ of the sensor.

For the embodiment of FIG. 4 as well as the embodiment of FIG. 5, the voltage input at input ZS while AND gate 43 has a high or true output results in generation of an analog current level $A_c$ whose amplitude depends on the voltage applied at input ZS of the converter 51. This current level can be scaled as required. For either embodiment, sequencer unit 27 will continue providing an analog current as long as the poll pulse is present on line 35. Thus, if it is desired to stop and examine the delta level or status of a particular sequencer unit, this can be done by maintaining a high poll signal on line 35, or in effect extending the poll pulse. The current generated during the Poll pulse is used to charge capacitors C1 and C2 to a voltage dependent on the analog current level $A_c$.

When the poll pulse (here, poll pulse H) is terminated, input W of AND gate 39 goes low, causing the output of that gate to also go low. This negative transition is applied to latch 45, and causes that gate to toggle or change state. As a result, the not-Q output of latch 45 goes high, causing the output of inverting latch 47 receiving that output to go low. Since the output of latch 47 is low, and since the output of AND gate 39 is also low, both inputs X and Y of AND gate 43 are now low, so that the output of gate 43 is low. This removes the voltage input at input ZS to inverter 51. Therefore, the current level produced by converter 51 falls to a negligible value or some preset "null" value. Also, once latch 45 is thereby latched, its output goes high. This high output causes the output of inverter 41 to go low. This prevents any further poll pulses from activating AND gate 39, as input V is held low. Since latch 47 is thereby holding the output of AND gate 43 low, any subsequent poll pulses on line 35 will not result in any generation of current by converter 51 for that particular sequencer unit.

When poll pulse H is terminated, the output of AND gate 39 goes low. This negative transition causes latch 45 to toggle, causing its not-Q output to go high. This change in the output of latch 45 causes the output of inverting latch 47 to go low. Thus, input Y of AND gate 43 goes low and switches off the voltage input to converter 51. This stops converter 51 from generating any current. Accordingly, analog current $A_c$ is generated by that particular sequencer unit only during the first Poll pulse received by that sequencer unit, and terminates when that pulse removed. Furthermore, any subsequent Poll pulse will not turn on converter 51, because latch 47 continues to provide a low output that prevents AND gate 43 from switching on. Inverter 41 input goes high, its output goes low and prevents any subsequent polling pulse on line 35 from operating AND gate 39. Thus a sequencer unit 27 can only be polled once during a cycle, and is reset at the end of the cycle by the Loop Reset pulse which temporarily removes voltage.

When the not-Q output of latch 45 goes high, its high signal is applied to the gate electrode of FET switch 29, closing that switch. Thus, there is now electrical connection, via first sequencer unit 27-1, between control 37 and second sequencer unit 27-2. As each subsequent sequencer unit is polled sequentially, it goes through the above process and in turns switches the next sequencer unit into the circuit.

At the end of poll pulse H, there is a short wait period J, which allows system 25 to settle. At the end of wait period J, microprocessor 55 transmits a read pulse K which shortcircuits capacitor C1. Simultaneously, microprocessor 55 reads the voltage across C2 via analog to digital converter 57. Capacitor C1 is shortcircuited to disconnect or shunt any transients from the input while analog to digital converter 57 reads the voltage level on capacitor C2. Microprocessor 55 now stores the relative sequencer level from first sequencer 27-1 obtained via storage capacitor C2. As used herein, the term relative sequencer level means the voltage reading taken across sensor resistor $R_s$ after that sequencer unit has been polled. This reading is the sum of the datum or noise level previously determined, and the delta or absolute sequencer level. The delta or absolute sequencer level is the difference in voltage between the relative sequencer level voltage reading for that sequencer unit, and the datum voltage reading. Microprocessor 55 can now obtain the delta level by subtracting the value of the datum previously determined for the first sequencer unit from the relative sequencer level for the first sequencer unit. Accordingly, the delta level is only the voltage generated by the analog current $A_c$ from first sequencer 27-1. Immediately following read pulse K is a wait period L. Examples of datum levels and relative sequencer levels are shown in FIG. 5. Data acquisition from first sequencer 27-1 is now completed.

FIG. 5 shows subsequent pulses M through U, which are respectively identical to corresponding pulses C through K for the first sequencer 27-1. Data from second sequencer unit 27-2 is read in a manner similar to that described above for first sequencer unit 27-1. A similar process is used for all subsequent sequencer units. Thus, each sequencer unit first has the datum or noise level recorded by microprocessor 55, and then the analog value is sampled and measured by the microprocessor. This process continues until all the sequencers have been polled.

As discussed above, microprocessor 55 is pre-programmed with the number of sequencer units to which control 37 is then connected. When microprocessor 55 has completed sending that number of Poll pulses on line 35, so that all sequencer units 27 have been polled, and sufficient time has elapsed to allow for reading of the current level from the last sequencer unit 27-Z, microprocessor 55 generates another Loop Reset pulse on line 31 to temporarily remove power from the loop wiring 31, 33 and 35 and from the sequencer units 27. This causes all the sequencer units to reset, with the edge triggered latches 45 reset, latches 47 reset, and switches 29 opened. The apparatus of FIG. 3 is now ready for the next polling cycle.

After all of the sequencer units have been polled, microprocessor 55 generates a Loop Reset pulse A which is provided by control 37 on line 31 to all sequencer units 27. The polling process then proceeds for another cycle.

Although in FIG. 7 the Loop Reset pulse, Poll pulse, Read pulse and Level Clear pulse are all shown as originating from separate lines from microprocessor 55, these pulses can be generated on the same output line of microprocessor 55 by also providing for simultaneous generation of a corresponding address for the location in control 37 that is to receive that particular pulse.

In FIG. 7, diode Dc compensates for the voltage drop across diode D1. The positive voltage from the 6.8 Kohm resistor keeps diode Dc forward biased.

If a sequencer unit is not in place or if any wiring to a sequencer unit is broken, then the next sequencer unit downstream cannot be electrically connected to control 37, and cannot provide any analog signals to control 37. If a sequencer unit being interrogated by control 37 does not produce any analog datum or relative sequencer level values, such that capacitor C2 does not have impressed across it any substantial voltage to be read by microprocessor 55, then microprocessor 55 interprets this lack of any signal level as indicating a failed sequencer unit. Microprocessor 55 accordingly recognizes this failure condition and can therefore identify where the fault is by referring to the count number of the last reporting sequencer unit. Alternatively, such identification can be on the basis of lack of a response to a Read pulse intended for the failed sequencer unit.

The delta level signals stored by microprocessor 55 can, after processing, be used to provide signals, outputs or displays depending on the values of the delta levels. Thus, pre-programmed levels can be stored in the associated memory of microprocessor 55, so that if the signal levels from the sequencer units 27 are above or below the stored level for a particular sequencer unit or group of sequencer units, then an appropriate output signal or display is provided by control 37.

Sequential polling of sequencer units is described above. Random polling is accomplished in a similar manner. If, for example, sequencer unit 27 K (not shown) is to be polled, where K is any integer, then microprocessor 55 would rapidly poll preceding sequencer units 27-1 through 27-(K-1). When sequencer unit 27-K is then polled, the poll signal is kept high by microprocessor 55. This keeps sequencer unit 27-K on line as long as the poll signal remains high. Continuous reading of sequencer unit 27-K can then be obtained.

Figure 4A:
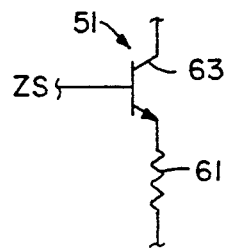
FIG. 4A is a diagrammatic representation of one embodiment of a voltage to current converter that can be utilized in the sequencer unit of FIG. 4 or in the sequencer unit of FIG. 6.

AND gates 39 and 43 can, for example, each be a unit of a National Semiconductor CD4081BM/CD4081BC Quad 2-Input AND Buffered B Series Gate. Inverter 41 can, for example, be a unit of a National Semiconductor CD4069UBM/CD4049UBC Inverter Circuit, or a CD4049UBM/CD4049UBC Hex Inverting Buffer Voltage to current converter 51 can, for example, be as shown in FIG. 4A. The resistor 61 of FIG. 4A is there shown as having a value of 200 ohms. Current through converter 51 is dependent on the voltage applied to the base electrode of transistor 63, e.g. 6 V/200 ohms = 30 mA.

The component values shown in FIGS. 4A, 6 and 7 are illustrative or exemplary, but other values for such components can be utilized.

Obviously, many modifications and variations of the present invention are possible in light of the above teachings. It is therefore to be understood that the foregoing embodiments are presented by way of example only and that, within the scope of the appended claims and equivalents thereto, the invention may be practiced otherwise than as specifically described.

What is claimed is:

1. Apparatus for monitoring a variable, comprising:
   controller means;
   a first electrical line emanating from said controller means;
   means, within said controller means, for generating a reset signal and sending the reset signal along said first electrical line;
   a second electrical line emanating from said controller means;
   means, within said controller means, for receiving a sensing signal on said second electrical line;
   a third electrical line emanating from said controller means;
   means, within said controller means, for generating a polling signal and sending the polling signal along said third electrical line;
   sensing means, connected to the second electrical line, for sensing a value of the variable and for producing said sensing signal, on said second electrical line, indicative of that value when said polling signal is present on said third electrical line;
   means for sensing the noise level on said electrical lines before said sensing signal is produced on said second electrical line; and
   means for determining the difference between said received sensing signal and said noise level.

2. Apparatus for monitoring as recited in claim 1, further comprising:
   first enabling means, connected to said third electrical line and connected to said second electrical line, for turning on said sensing means when said polling signal is present on said third electrical line, for turning off said sensing means and permitting passage of electrical current through said second electrical line in response to removal of the polling signal on said third electrical line, and for inhibiting provision of the sensing signal on said second electrical line in response to that removal.

3. Apparatus for monitoring as recited in claim 2 wherein
said first enabling means includes a reset means, responsive to the reset signal, for resetting said enabling means to prevent passage of electrical current through said second electrical line.

4. Apparatus for monitoring as recited in claim 2, wherein said controller means comprises:
a computer; and
storage means connected to said second electrical line for storing the sensing signal value on said second electrical line,
wherein said computer includes read means for providing a read signal to said storage means for transfer of the stored value from said storage means to said computer.

5. Apparatus for monitoring as recited in claim 4 wherein said storage means comprises:
a resistor connected to said second electrical line;
a capacitor connected across said resistor; and
a switching transistor connected across said capacitor, the switching electrode of said transistor being connected to said computer to receive the read signal.

6. Apparatus for monitoring as recited in claim 2 wherein said first enabling means comprise:
second enabling means, connected to said third electrical line for producing a switching signal indicative of whether the polling signal level has appeared on and been removed from said third electrical line, and for providing to said sensing means a control signal indicative of whether the polling signal level on said third electrical line has appeared; and
switching means, connected in said second electrical line and responsive to the switching signal, for permitting passage of electrical current therethrough in response to removal after appearance of the polling signal on said third electrical line.

7. Apparatus for monitoring as recited in claim 6 wherein said second enabling means comprises:
a first AND gate having a first, noninverted input connected to said third electrical line and a second inverted input receiving the first switching signal;
a negative-edge-triggered device receiving the output of said first AND gate for producing the first switching signal;
a latch receiving the first switching signal for producing a second signal; and
a second AND gate, having a first input connected to the output of said first AND gate and a second input connected to receive the second signal, for producing the control signal.

8. Apparatus for monitoring as recited in claim 7 wherein said switching means comprises a transistor receiving the first switching signal at its switching electrode and having each of two other electrodes connected to said second electrical line.

9. Apparatus for monitoring as recited in claim 6 further comprising a voltage-to-current converter receiving the sensing signal, connected to said second electrical line between said switching means and said controller means, and connected to said first electrical line.

10. Apparatus for monitoring as recited in claim 9, wherein said sensing means comprises a voltage dividing network connected to the output of said second AND gate, to said second electrical line between said switching means and said controller means, and to said voltage-to-current converter.

11. Apparatus for monitoring as recited in claim 9, further comprising:
an operational amplifier receiving at one input the output of said sensing means, and having its power input connected to the output of said second AND gate, and having its output connected to said voltage-to-current converter.

12. Apparatus for monitoring a variable, comprising:
controller means;
a first electrical line;
a second electrical line;
a third electrical line, wherein each of said electrical lines independently emanate from said controller means;
first sensing means, connected to said second electrical line, for sensing the value of the variable and producing a sensing signal on said second electrical line when turned on;
means for sensing the noise level on said electrical lines before said sensing means is turned on and said sensing signal is produced on said second electrical line;
first gating means, connected to said third electrical line, for producing a first signal indicative of whether a polling signal is present on said third electrical line;
first latching means, responsive to the first signal, for producing a first switching signal indicative of whether the polling signal has appeared on and been removed from said third electrical line and for producing a second signal indicative of whether the polling signal on said third electrical line is present;
second gating means, responsive to the second signal, for turning on said first sensing means;
means for sensing the level of said sensing signal on said second electrical line;
means for determining the difference between said sensing signal and said noise level; and
first switching means, connected in said second electrical line and responsive to the first switching signal, for permitting passage of electrical current therethrough in response to disappearance of the polling signal on said third electrical line.

13. Apparatus for monitoring as recited in claim 12, wherein:
said controller means generates the polling signal on said third electrical line; and
said means for sensing the level of said sensing signal includes reading means, connected to said second electrical line, for receiving the sensing signal from said sensing means, said reading means operatively connected to said controller means, wherein said controller means is responsive to said stored sensing signal.

14. Apparatus for monitoring as recited in claim 12, further comprising:
third gating means, connected to said third electrical line, for producing a third signal indicative of whether a polling signal is present on said third electrical line;
second latching means, responsive to the third signal, for producing a second switching signal indicative of whether the polling signal has appeared on and been removed from said third electrical line and for producing a fourth signal indicative of whether the polling signal on said third electrical line is present;

fourth gating means, responsive to the fourth signal, for turning on a second sensing means; and second switching means, connected across said second electrical line and responsive to the second switching signal, for permitting passage of electrical current therethrough in response to appearance and removal of polling signal on said third electrical line;

whereby said first switching means provides for electrical connection to said second switching means in response to presence and subsequent removal of the polling signal on said third electrical line.

15. Apparatus for monitoring as recited in claim 14, wherein:

said controller means generates the polling signal on said third electrical line; and said means for sensing the level of said sensing signal includes reading means, connected to said second electrical line, for receiving the sensing signal from said sensing means, said reading means operatively connected to said controller means, wherein said controller means is responsive to said stored sensing signal.

16. A method for sequentially multiplexing data signals from a plurality of sensors, comprising the steps of:

reading, on a storage device, the noise level between the controller and one of the sensors without the presence of a sensing signal indicative of the level of a variable being sensed by that one sensor;

clearing the storage device;

providing a reset signal to the sensors along a first electrical line for resetting each sensor;

providing polling signal to one of the sensors along a second electrical line;

in response to the a polling signal, generating at the one of the sensors the sensing signal for provision to the storage device along a third electrical line;

reading the sensing signal on the storage device;

clearing the storage device;

determining the difference between the level of the read sensing signal and the noise level; and repeating all of the above steps except for the providing a reset signal step for each of the remaining sensors.

17. A method as recited in claim 16 wherein:

said providing a reset signal step includes disconnecting, from the storage device, all but the one of the sensors; and said method further comprises the step of, after said generating step, connecting another one of the sensors to the storage device.

* * * * *